United States Patent [19]

Schaaf et al.

[11] Patent Number: 4,686,914
[45] Date of Patent: Aug. 18, 1987

[54] SEED PLANTER

[75] Inventors: David E. Schaaf, Lethbridge; Fransesco M. Jorna, Nobleford, both of Canada

[73] Assignee: Versatile Corporation, Vancouver, Canada

[21] Appl. No.: 828,580

[22] Filed: Feb. 11, 1986

Related U.S. Application Data

[63] Continuation of Ser. No. 530,882, Sep. 9, 1983, abandoned.

[51] Int. Cl.$^4$ .............................................. A01C 5/08
[52] U.S. Cl. ........................................ 111/73; 111/85
[58] Field of Search ................... 111/32, 34, 50, 73, 111/80, 85, 86, 10, 1, 52, 62, 68, 63, 77

[56] References Cited

U.S. PATENT DOCUMENTS

| | | | |
|---|---|---|---|
| 48,441 | 6/1865 | Rice | 111/62 |
| 682,473 | 9/1901 | Lindsay | 111/32 |
| 939,812 | 11/1909 | Davis | 111/85 |
| 953,902 | 4/1910 | Danielson | 111/86 |
| 987,388 | 3/1911 | Marsh | 111/86 |
| 1,065,990 | 7/1913 | Walker | 111/68 |
| 1,116,270 | 11/1914 | Harper | 111/73 X |
| 1,229,604 | 6/1917 | Garst | 111/80 |
| 1,281,873 | 10/1918 | Swiggart | 111/80 |
| 1,362,834 | 12/1920 | Barfield | 111/80 |
| 2,159,652 | 5/1939 | Brunner | 111/73 |
| 2,357,760 | 9/1944 | Peacock | 111/73 X |
| 2,441,466 | 5/1948 | Boren | 111/63 |
| 2,713,836 | 7/1955 | Ajero | 111/80 |
| 2,764,111 | 9/1956 | Collins | 111/73 |
| 2,921,640 | 1/1960 | Roppel | 111/85 |
| 3,428,257 | 2/1969 | Rentfield et al. | 239/601 |
| 3,507,233 | 4/1970 | Greig et al. | 111/85 |
| 3,752,237 | 8/1973 | Hornung | 172/538 |
| 3,998,276 | 12/1976 | MacMillan | 111/10 |
| 4,373,455 | 2/1983 | Friggstad | 111/86 |
| 4,417,530 | 11/1983 | Kopecky | 111/73 |
| 4,520,742 | 6/1985 | Anderson | 111/86 |

FOREIGN PATENT DOCUMENTS

| | | | |
|---|---|---|---|
| 148485 | 4/1951 | Australia | 111/80 |
| 109659 | 5/1968 | Denmark | 111/85 |
| 2117135 | 10/1971 | Fed. Rep. of Germany | 111/80 |
| 1950 | 1892 | Norway | 111/86 |

Primary Examiner—James R. Feyrer
Attorney, Agent, or Firm—Wenderoth, Lind & Ponack

[57] ABSTRACT

A seed drill has a hoe point operable to create a furrow and a fertilizer feed shank to apply fertilizer in the furrow. A seed tube is operatively positioned behind the hoe point and fertilizer feed shank within the furrow and is vertically adjustable relative to the fertilizer feed shank and hoe point. An adjustable hoe bed provides vertical movement of the hoe points and seed tubes relative to the main frame of the seed drill. An adjustable banding cup adaptor meters the feed of fertilizer to either the fertilizer feed shank or the seed tube. V-shaped packer wheels create V-shaped soil compaction which allows for water retention and plant protection.

2 Claims, 8 Drawing Figures

SEED          FERTILIZER

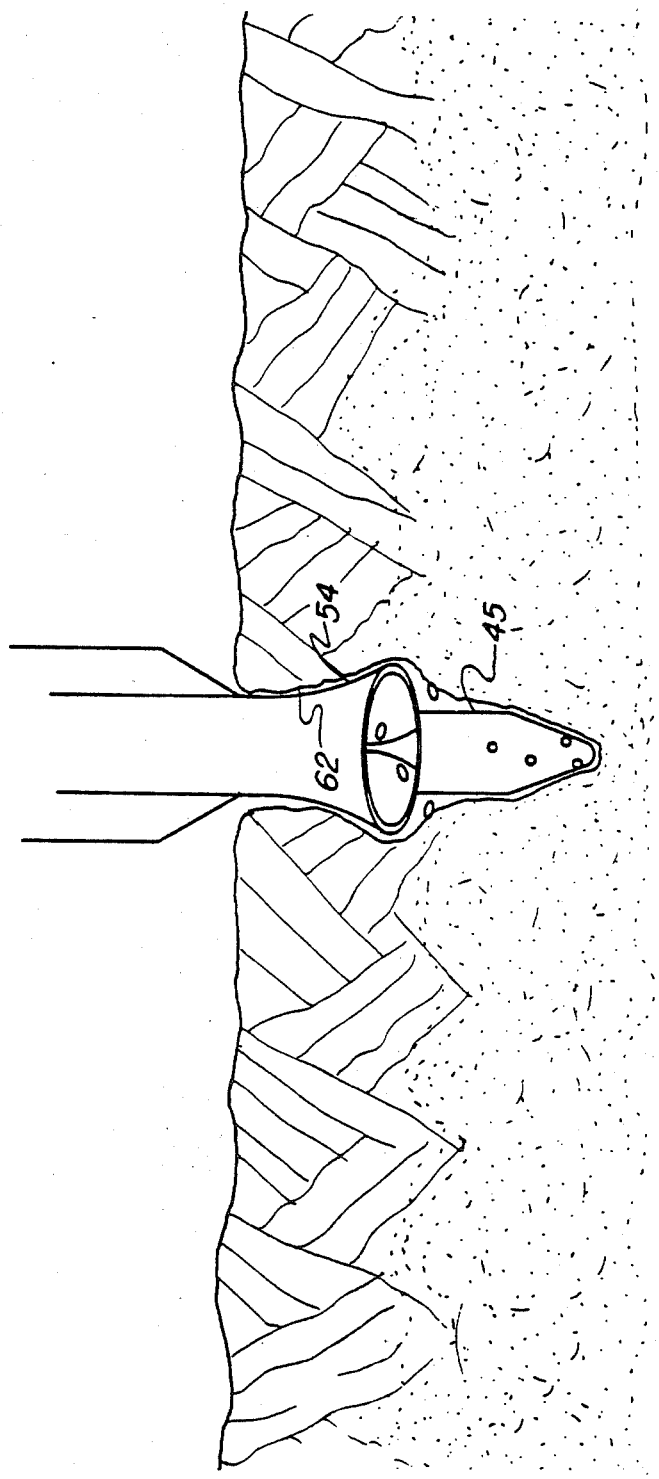

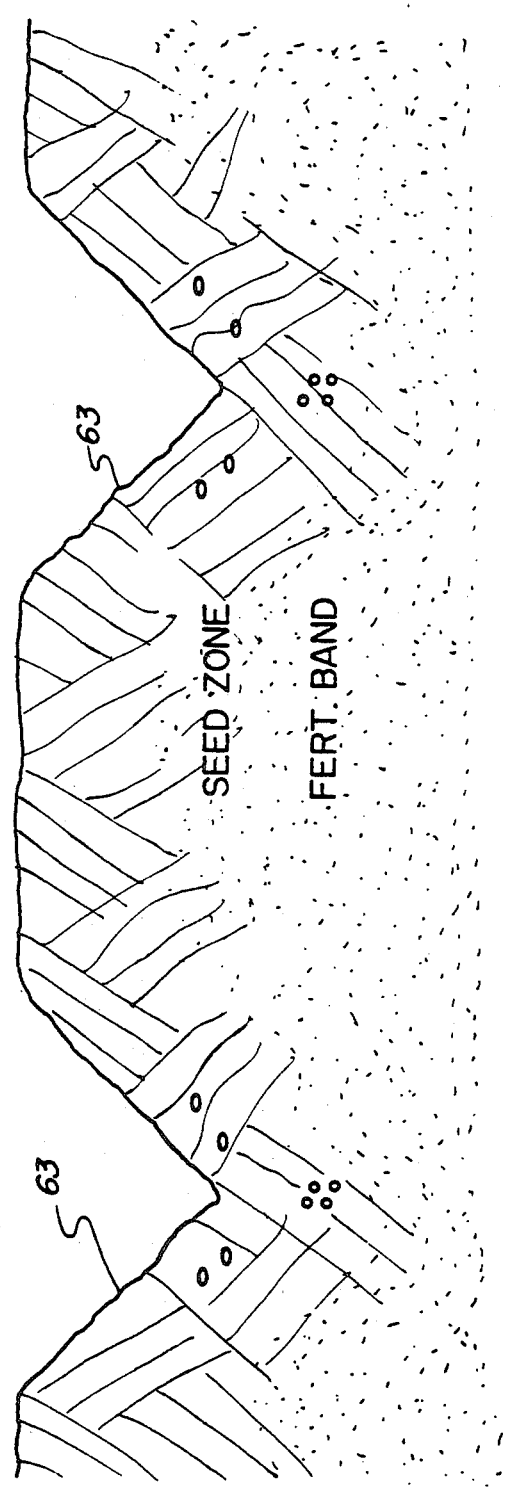

SEED PLANTER

This application is a continuation, of now abandoned application Ser. No. 530,882, filed Sept. 9, 1983, now abandoned.

This application relates to an improved seed drill and, more particularly, to an improved seed drill combining independent and simultaneous seed and fertilizer application functions.

BACKGROUND OF THE INVENTION

Seed drills are used to plant seeds. It is desirable to simultaneously fertilize the seed when it is planted and, further, to provide compaction of the soil above the seed and fertilizer since compacted soil will better retain moisture and aid germination. While there exist seed drills which accomplish these objectives, there are inherent disadvantages with these drills.

It is desirable to position the fertilizer below and to the side of the seed in an operation called "side banding". In many drills, the fertilizing and seed planting are accomplished in individual operations which is time consuming or the fertilizer is placed directly with the seed. In other drills, compaction is provided by flat packer wheels. This is disadvantageous since there is no V-shaped furrow to hold moisture in reserve for the germinating seed and there is little protection from the wind and other elements. Some drills provide an unprotected "side banding" seed depositing head that creates its own furrow and runs directly through the soil. Such a head is subject to rapid wear and damage from obstacles in the soil. Other seed drills create an unnecessarily large furrow when it is desirable to disturb as little soil as possible. Some seed drills provide no adjustment to vary the fertilizer deposition depth relative to the seed deposition depth when the seed and fertilizer are being simultaneously and separately planted. Other seed drills provide no opportunity to plant the seed and fertilizer together nor to adjust the proportion of fertilizer with the seed. Other drills provide no adjustment of the hoe points relative to the implement main frame.

SUMMARY OF THE INVENTION

According to the present there invention, is disclosed a seed drill comprising a frame, seed feeding means, fertilizer fertilizer tube means extending from said fertilizer feeding means, seed delivery tube means extending from said seed feeding means, hoe point means rigidly connected to a hoe bed, said bed being rigidly connected to said frame, said bed having means allowing vertical adjustment of said bed relative to said frame, a packer wheel having a circumferential V-shaped rim portion following each of said hoe point means and being operable to compact soil within said furrow in a V-shaped configuration, said fertilizer tube means being operatively located behind said hoe point means to apply fertilizer within said furrow and said seed tube means being operatively located behind said hoe point means to deposit seed within said furrow, said seed and fertilizer being deposited prior to passage of said packer wheels.

BRIEF DESCRIPTION OF THE SEVERAL VIEWS OF THE DRAWINGS

The invention will now be described, by way of example only, with reference to the accompanying drawings in which:

FIG. 4 is a view looking forwardly along arrow IV in FIG. 1 while the seed drill is operating;

FIG. 5 is a view showing furrow formation, with seed and fertilizer placement following passage of the seed drill;

DESCRIPTION OF SPECIFIC EMBODIMENT

Figure 1:
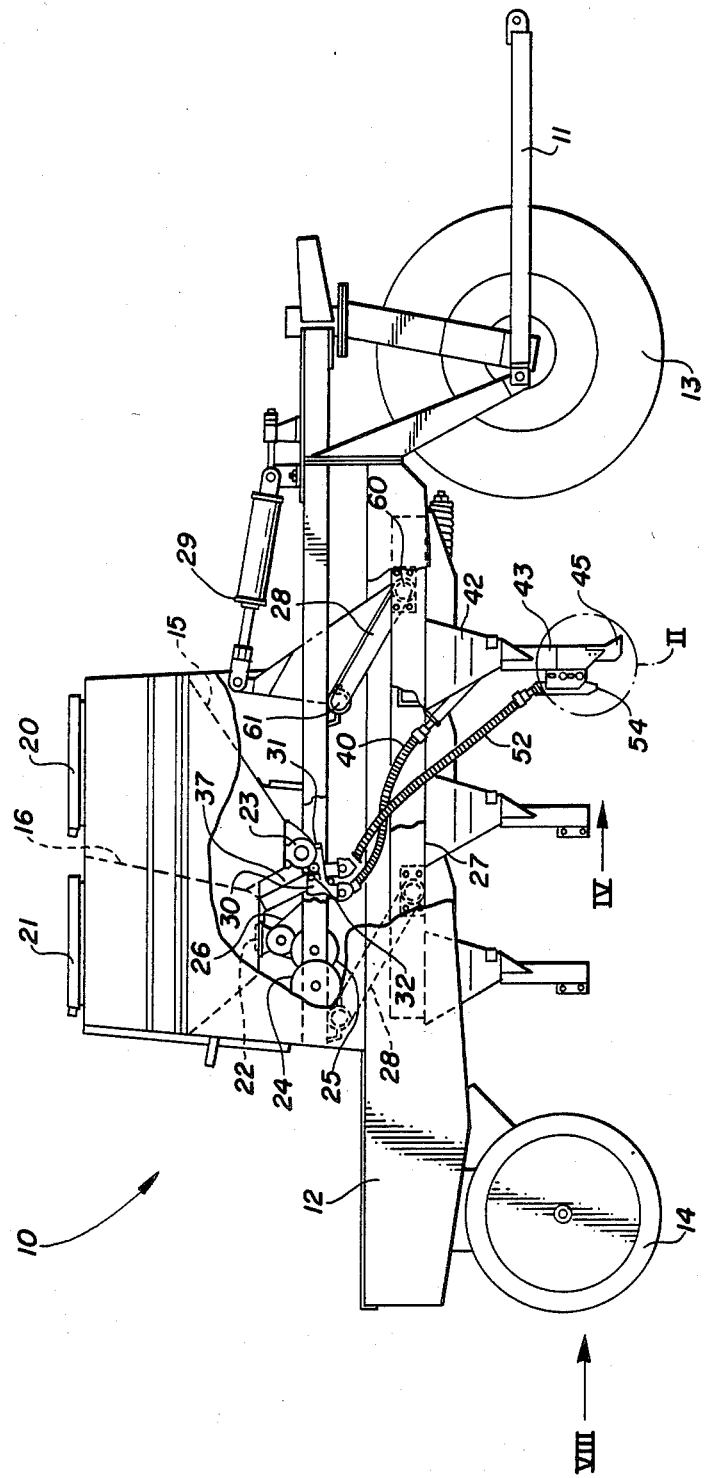
FIG. 1 is a side view of the seed drill according to the invention with the inside seed and fertilizer delivery apparatus being shown in a partial cutaway.

A seed drill is shown generally at 10 in FIG. 1. It has a hitch 11 for connection to a source of pull power such as a tractor (not shown). Hitch 11 is connected to the main frame 12. Castor wheels 13 are pivotably mounted to the forward end of main frame 12 and V-shaped packer wheels 14 are rotatably mounted to the rearward end of main frame 12.

Seed and fertilizer tanks 15, 16, respectively, are located on the upper part of main frame 12 and access doors 20, 21 are located on the top of seed and fertilizer tanks 15, 16, respectively, for loading. A mechanically driven star wheel 22 is mounted at the exit of fertilizer tank 16. A mechanically driven fluted cylinder 23 is mounted at the exit of seed tank 15.

A drive sprocket 24 is powered by a chain drive (not shown) attached to packer wheels 14. Drive sprocket 24 is coupled through a series of sprockets 25 and chain drives 26 to respective shafts (not shown) connected to star wheel 22 and fluted cylinder 23.

A hoe bed 27 is pivotably mounted to main frame 12 by hoe bed axles 28. Hoe bed 27 is movable independently by mechanical link 29 and moves vertically relative to main frame 12.

Figure 6:
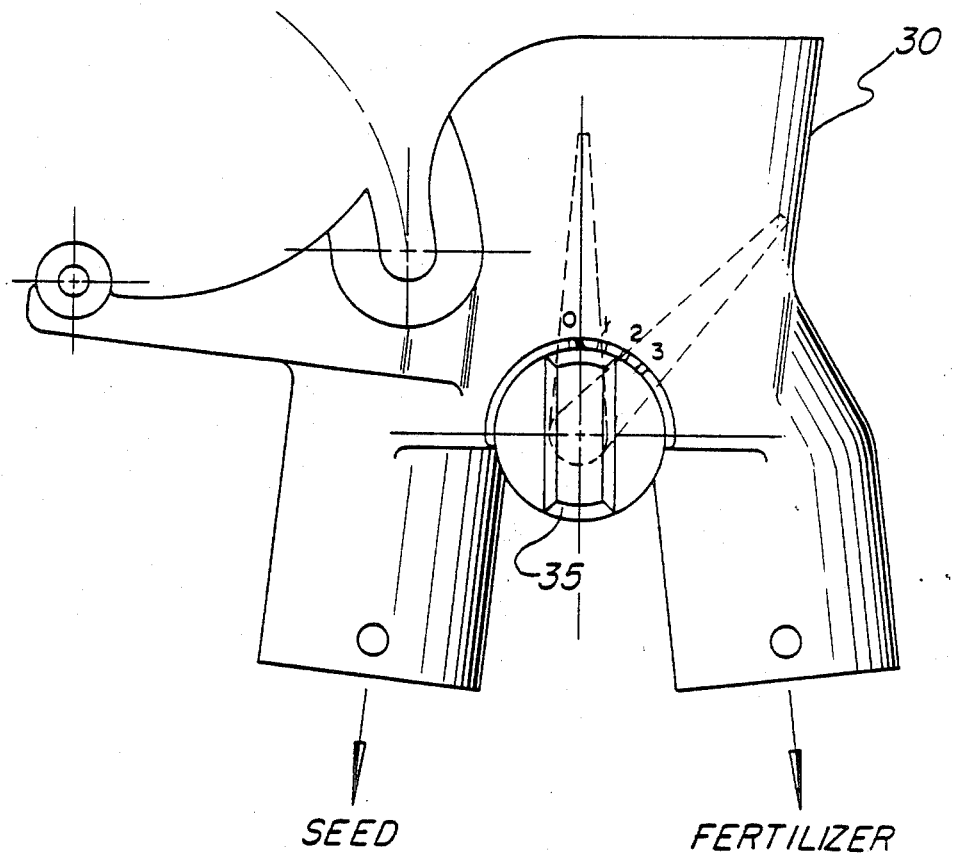
FIG. 6 is a side view of a banding cup adaptor.
Figure 7:
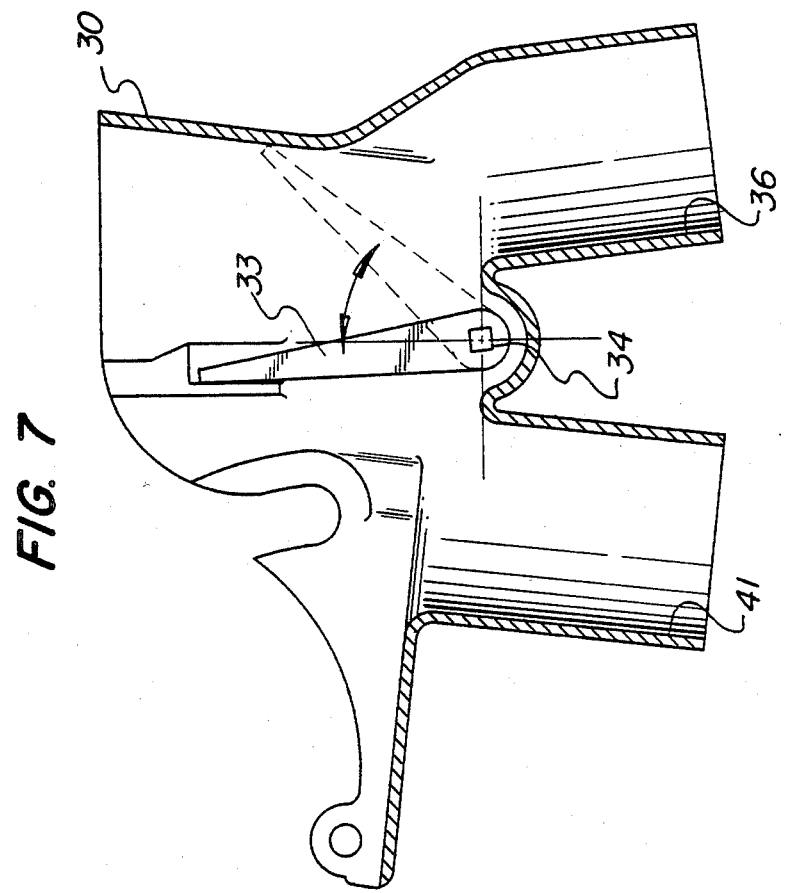
FIG. 7 is a cutaway view of the banding cup of FIG. 6.

A banding cup adaptor 30 is shown more clearly in FIGS. 6 and 7. Banding cup adaptor 30 is located below the star wheel 22 and fluted cylinder 23 and is pivotably mounted at 31 to the lower portion of seed tank 15. A removable pin 32 retains the banding cup adaptor 30 in its operating position.

A flapper valve 33 (FIG. 7) is pivotally mounted within banding cup adaptor 30. It is rotatable about axis 34 and adjustably divides the seed entrance and exit passageways from the fertilizer entrance and exit passageways. An adjustment knob 35 is provided externally of banding cup adaptor 30 (FIG. 6) to select the desired position of flapper valve 33 which may range from the first position shown in solid in FIG. 7 wherein the seed and fertilizer entrance and exit passageways are uninterrupted to the position shown in phantom where the fertilizer exit passageway 36 is entirely closed.

Figure 2:
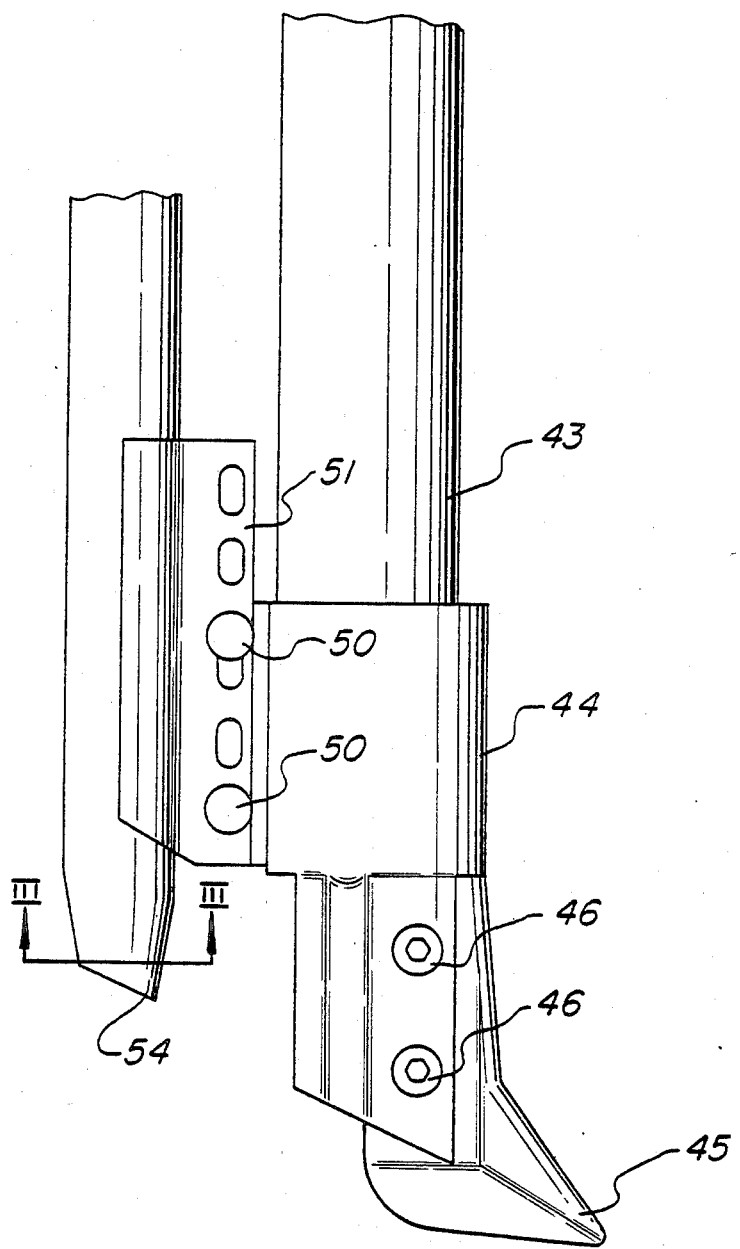
FIG. 2 is an enlarged side view of the area II of FIG. 1.

A fertilizer feed tube 40 is connected to banding cup adaptor 30. It extends downwardly to opener 42 and thence to the fertilizer feed shank 43. A rearwardly extending attachment boot 44 as better seen in FIG. 2 is mounted to fertilizer feed shank 43 and a hoe point 45 is mounted on the end of a rearwardly extending attachment boot 44 by bolts 46. Bolts 50 are used to connect a retaining bracket 51 to the attachment boot 44.

A seed delivery tube 52 is connected to banding cup adaptor 30. It extends downwardly to seed tube 54. Seed tube 54 is mounted by welding to retaining bracket 51 and extends downwardly to its termination point above the vertically lowermost termination point of hoe point 45. Bolts 50 are removable and seed tube 54 can be moved vertically relative to attachment boot 44 to obtain the desired seed and fertilizer deposition locations.

Figure 3:
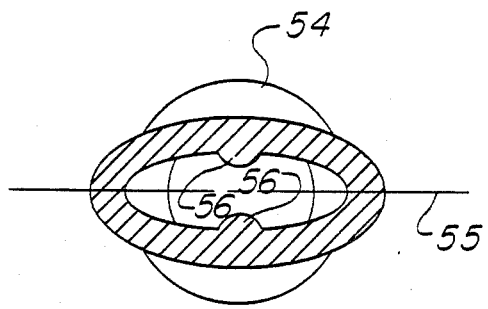
FIG. 3 is a cross-sectional view taken along the line III—III of FIG. 2.

Referring to FIG. 3, seed tube 54 has an elliptical shaped lower portion with the longitudinal axis 55 extending transverse to the direction of drill movement. Opposed protuberances 56 protrude inwardly from the inside surfaces of the seed tube 54 and extend vertically in the seed tube 54 to the transition zone between the upper round tube and the oval shaped lower portion.

Figure 8:
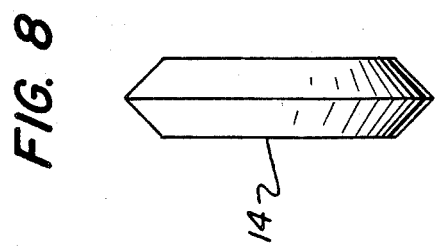
FIG. 8 is a view of the packer wheel only taken along arrow VIII of FIG. 1.

Packer wheels 14 are located rearwardly of the hoe point 45 and seed tube 54. As seen in FIG. 8, they have a circumferential V-shaped outer rim.

OPERATION

In operation, the seed drill 10 is attached behind a tractor (not shown) and the seed and fertilizer tanks 15, 16 are filled through access doors 20, 21, respectively. The seed drill 10 will move rightwardly as viewed in FIG. 1.

As the seed drill 10 moves, mechanical link 29 is adjusted. Mechanical link 29 is directly connected to hoe bed axles 28 which rotate about axes 60, 61. Hoe bed 27 is therefore raised or lowered with the result that hoe point 45 and attached seed tube 54 may extend into the earth being worked a depth as desired by the operator.

Seed from seed tank 15 is metered by mechanically driven fluted cylinder 23 and passes into banding cup adaptor 30. Flapper valve 33 does not affect the delivery of the seed through banding cup adaptor 30 and the seed will pass to seed delivery tube 52 and into seed tube 54. Referring to FIG. 3, protuberances 56 in the lower elliptical portion in the seed tube 54 act to divide the flow and, as seen by FIGS. 4 and 5, the seeds are released to the side of furrow 62.

Fertilizer from fertilizer tank 16 is metered by mechanically driven star wheel 22. It passes downwardly through a tube 37 into banding cup adaptor 30. The flapper valve 33 in banding cup adaptor 30 is adjusted as desired from a position fully closing the fertilizer exit passageway 36 to a position leaving it fully open. In the fully closed position, the fertilizer will all pass to the seed exit passageway 41 and accompany the seed for simultaneous deposition therewith. In the fully open position, all of the fertilizer will be deposited separately from the seed. In a position between these two extreme positions, the flapper valve 33 will direct a portion of fertilizer to the seed exit passageway 41 and a portion to the fertilizer exit passageway 36 as desired by the operator with the use of adjuster knob 35. The fertilizer passes to fertilizer feed tube 40, thence to opener 42 and fertilizer feed shank 43. It is deposited near the bottom of the furrow created by the hoe point 45.

Hoe point 45 creates the furrow 62, and, therefore, protects the following seed tube 54 from undue wear. Subsequent to the passage of hoe point 45 and seed tube 54, packer wheels 14 provide compaction to the soil and form V-shaped furrows 63 seen in FIG. 5 which covers the seeds and fertilizer. V-shaped furrows 63 act as reservoirs for moisture and provide protection for the sensitive seedling when it germinates.

The depth between the fertilizer and the seeds may be adjusted. Bolts 50 are removed and the seed tube 54 together with retaining bracket 51 may be moved vertically relative to attachment boot 44. Thus, the operator may select the desired configuration.

It may be desired in certain operating conditions to have the longitudinal axis 55 of seed tube 54 (FIG. 3) parallel rather than transverse to the direction of seed drill movement. This would reduce wear on the extremities of the seed tube 54 and would cause the seed to be deposited in an unbroken stream directly above the fertilizer. Accordingly, it may be desired to include an adjustment to allow the seed tube 54 to be rotated as necessary. It may also be desired to provide a seed tube 54 without a lower oval portion. This would again reduce wear and provide an unbroken stream of seeds.

Yet a further modification would provide remote control means for adjusting the flapper valve 33 in banding cup adaptor 30.

Although various specific embodiments and modifications of the invention have been described, it is not intended to limit the scope of the invention thereby which should be construed in accordance with the accompanying claims.

I claim:

1. A seed drill comprising a frame, seed feeding means, fertilizer feeding means, fertilizer tube means extending from said fertilizer feeding means and seed delivery tube means extending from said seed feeding means to a hoe point means, means for vertical adjustment of said seed tube means relative to said fertilizer tube means, said hoe point means being rigidly connected to a hoe bed means, said hoe bed means being pivotably connected to said frame, said hoe bed means having means allowing vertical adjustment of said hoe bed means relative to said frame, a packer wheel having a circumferential V-shaped ring portion following each of said hoe point means and being operable to compact soil within said furrow in a V-shaped configuration, said fertilizer tube means being operatively located behind said hoe point means to apply fertilizer within said furrow and said seed tube means being operatively located behind said hoe point means to deposit seed within said furrow, said seed and fertilizer being deposited prior to passage of said packer wheels, said seed tube means having an elliptical end portion, the longitudinal axis of said end portion extending transverse to the direction of seed drill movement and further having an interior seed divider, said divder being operable to divide seed for deposit on both sides of the centre line of said seed tube means and on opposite sides of said furrow.

2. A seed drill comprising a frame, seed feeding means, fertilizer feeding means, a hoe point means operable to create a furrow in soil, said hoe point means being rigidly connected to a hoe bed, said bed being pivotably connected to said frame, said bed having means allowing vertical adjustment of said bed relative to said frame, a fertilizer tube means operatively located behind said hoe point means to apply fertilizer within said furrow, a seed tube means operatively located behind said hoe point means, said seed tube means having an elliptical end portion, the longitudinal axis of said end portion extending transverse to the direction of seed drill movement and an interior seed divider, said divider being operable to divide seed for deposit on both sides of the centre line of said seed tube means and on opposite sides of said furrow, said end portion positioned above the opening of said fertilizer tube means so as to deposit seed within said furrow and above said fertilizer, and a packer wheel for each of said hoe point means, each said packer wheel having a circumferential V-shaped rim portion following said hoe point means and being operable to compact soil within said furrow in a V-shaped configuration, said seed tube means having vertical adjustment means whereby relative adjustment between said hoe point and fertilizer tube means may be made.

* * * * *